(12) United States Patent
Amick et al.

(10) Patent No.: US 9,573,164 B2
(45) Date of Patent: Feb. 21, 2017

(54) DRY PRIMER FILM COMPOSITE AND USE THEREOF

(71) Applicant: Akzo Nobel Coatings International B.V., Arnhem (NL)

(72) Inventors: Matthew Paul Amick, Warren, MI (US); Daniel Chojnowski, Gibraltar, MI (US); David Naughton, Oxford, MI (US); Alexander Leo Yahkind, West Bloomfield, MI (US)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 14/772,982

(22) PCT Filed: Mar. 12, 2014

(86) PCT No.: PCT/EP2014/054760
§ 371 (c)(1),
(2) Date: Sep. 4, 2015

(87) PCT Pub. No.: WO2014/140056
PCT Pub. Date: Sep. 18, 2014

(65) Prior Publication Data
US 2016/0023243 A1 Jan. 28, 2016

Related U.S. Application Data

(60) Provisional application No. 61/790,302, filed on Mar. 15, 2013.

(30) Foreign Application Priority Data

Jun. 17, 2013 (EP) ..................................... 13172265

(51) Int. Cl.
*B05D 5/00* (2006.01)
*B05D 1/28* (2006.01)
(Continued)

(52) U.S. Cl.
CPC ............... *B05D 5/005* (2013.01); *B05D 1/286* (2013.01); *B05D 3/007* (2013.01); *B32B 9/00* (2013.01);
(Continued)

(58) Field of Classification Search
CPC ............ B05D 3/04; B05D 5/005; B05D 7/50; B05D 2503/00; B05D 2504/00; B05D 2508/00; B32B 9/00; B32B 27/08; B32B 27/38; B32B 27/36; B32B 27/40; B32B 2250/00; B32B 2307/70; B32B 2307/732; B32B 2307/734; B32B 2307/748; B32B 2363/00; B32B 2367/00; B32B 2375/00
(Continued)

(56) References Cited

U.S. PATENT DOCUMENTS 5,229,207 A 7/1993 Paquette et al.
5,518,786 A 5/1996 Johnson et al.
(Continued)

FOREIGN PATENT DOCUMENTS

CA 1338535 C 8/1996
WO 96/32453 A1 10/1996

OTHER PUBLICATIONS

International Search Report and Written Opinion of International Application No. PCT/EP2014/054760, mailed Jun. 16, 2014.
(Continued)

*Primary Examiner* — William Phillip Fletcher, III
(74) *Attorney, Agent, or Firm* — Nirav P. Patel (57) ABSTRACT

A dry primer film composite that includes a release carrier film and a pigmented sandable primer layer having a dry film thickness of 100 μm or greater overlying the carrier film, wherein the primer layer is a latent heat curing material; and uses of the dry primer film composite for spot repair of a substrate in need of repair. In preferred embodiments said
(Continued)

primer layer is formed from a coating composition comprising a binder chosen from thermosetting acrylics, GMA acrylics, urethanes, epoxies, polyester and combinations thereof.

18 Claims, 2 Drawing Sheets (51) Int. Cl.

| | | |
|---|---|---|
| B32B 7/04 | (2006.01) | |
| C09J 7/02 | (2006.01) | |
| B32B 27/40 | (2006.01) | |
| B32B 27/08 | (2006.01) | |
| B32B 27/36 | (2006.01) | |
| B32B 9/00 | (2006.01) | |
| B32B 27/38 | (2006.01) | |
| B05D 3/00 | (2006.01) | |
| C09D 5/00 | (2006.01) | |
| B05D 7/00 | (2006.01) | |

(52) U.S. Cl.
CPC ............. *B32B 27/08* (2013.01); *B32B 27/36* (2013.01); *B32B 27/38* (2013.01); *B32B 27/40* (2013.01); *C09D 5/002* (2013.01); *C09J 7/0257* (2013.01); *B05D 7/53* (2013.01); *B05D 2503/00* (2013.01); *B05D 2504/00* (2013.01); *B05D 2508/00* (2013.01); *B32B 2250/00* (2013.01); *B32B 2307/70* (2013.01); *B32B 2307/732* (2013.01); *B32B 2307/734* (2013.01); *B32B 2307/748* (2013.01); *B32B 2363/00* (2013.01); *B32B 2367/00* (2013.01); *B32B 2375/00* (2013.01); *C09J 2201/606* (2013.01); *C09J 2463/003* (2013.01); *C09J 2467/006* (2013.01)

(58) Field of Classification Search
USPC .................... 427/140, 375; 156/60; 428/354
See application file for complete search history.

(56) References Cited

U.S. PATENT DOCUMENTS

| | | |
|---|---|---|
| 6,086,995 A | 7/2000 | Smith |
| 6,096,396 A | 8/2000 | Patton et al. |
| 6,221,439 B1 | 4/2001 | Negele et al. |
| 7,722,938 B2 | 5/2010 | Truog et al. |
| 7,727,607 B2 | 6/2010 | Shih et al. |
| 7,842,363 B2 | 11/2010 | Truog et al. |
| 2003/0159773 A1 | 8/2003 | Tomiyama et al. |
| 2004/0101628 A1 | 5/2004 | Schneider et al. |
| 2004/0159969 A1* | 8/2004 | Truog ................ B32B 7/06 264/132 |
| 2005/0196607 A1* | 9/2005 | Shih ................... B32B 7/12 428/354 |
| 2005/0249946 A1 | 11/2005 | Hsu et al. |
| 2007/0092679 A1 | 4/2007 | Truog et al. |
| 2008/0113184 A1 | 5/2008 | Yoshida et al. |
| 2009/0011189 A1 | 1/2009 | Baumgart et al. |

OTHER PUBLICATIONS

European Search Report issued in counterpart EP Application No. 13172265.4, dated Nov. 21, 2013.

\* cited by examiner

S – substrate
P – primer
B – basecoat
C – clearcoat

DRY PRIMER FILM COMPOSITE AND USE THEREOF

This application is a national stage filing under 35 U.S.C. §371 of PCT/EP2014/054760, filed Mar. 12, 2014, which claims priority to U.S. Provisional Patent Application No. 61/790,302, filed Mar. 15, 2013, and European Patent Application No. 13172265.4, filed Jun. 17, 2013, the contents of which are each incorporated herein by reference in their entireties.

FIELD OF THE INVENTION

This invention relates generally to dry paint transfer films. Specifically, this invention relates to the use of a dry primer film for spot repair of a substrate, e.g., a vehicle surface spot repair.

BACKGROUND OF THE INVENTION

Virtually any vehicle is subject to being damaged and requiring repair. Automobiles, commercial vehicles, boats, airplanes, and the like include various exterior and interior panels that may be damaged due to a collision, misuse, or normal wear. It is often less expensive to repair the damaged panel than to replace it. This is especially true for light damage such as scrapes, scratches, chips, mar, and small dents. For heavier damage that affects the structural integrity of the panel, replacement is usually necessary.

For repair of light damage, the spot repair procedure is well known. This repair is done through a multi-step spray painting process to create an invisible repair. Spray painting involves masking off the area to be repaired, pouring and mixing of hazardous materials, e.g., contained in primer and paint topcoats, taking time to flash between spray coats, and energy to dry and cure the final coating. Pouring, mixing, and spraying of the paint results in exposure to spills and volatile organic content (VOC) in the vapors. VOC emission, in recent years, has been restricted by environmental protection laws. Flash off and curing between coats takes time and higher energy costs have driven up the cost for repair shops to cure the paint coat.

The primer coat is especially critical for the spot repair process. It provides a barrier for the substrate for chemical, UV, and heat exposure; it provides a means to adhere the topcoat to the substrate; and it provides sufficient film build to create a smooth, even repair. Application of the primer coat can also be the most time consuming and costly step in the repair process. Depending on the depth or severity of the damage, several coats of body filler and primer-surfacer may be necessary to cover the damage for a smooth repair. This involves spraying multiple coats of primer followed by drying, curing, and sanding. The spraying must be done in a spray booth or other area with proper air circulation for removal of harmful vapor. The primer then must be room or elevated temperature dried to cure the coat so it can be sanded. Once the primer is sanded, it may be determined that another primer coat is necessary to ensure a smooth finish. These multiple steps of spraying, curing, and sanding primer generally involve moving the vehicle around to different areas in a repair shop, where each task can be safely preformed taking up time and space in the shop.

Figure 1:
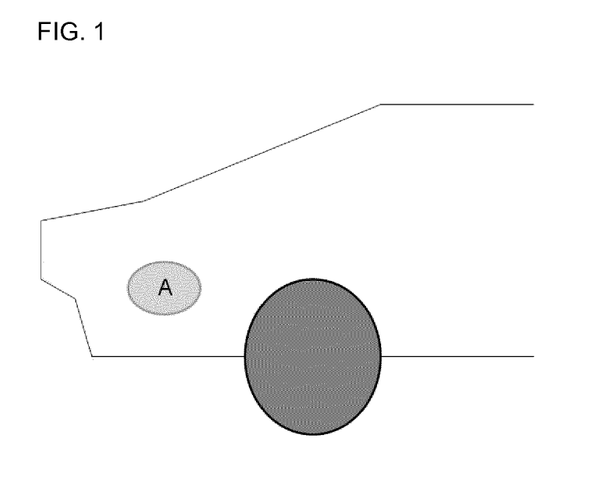
FIG. 1 is a schematic of a typical spot repair on a vehicle.
Figure 2:
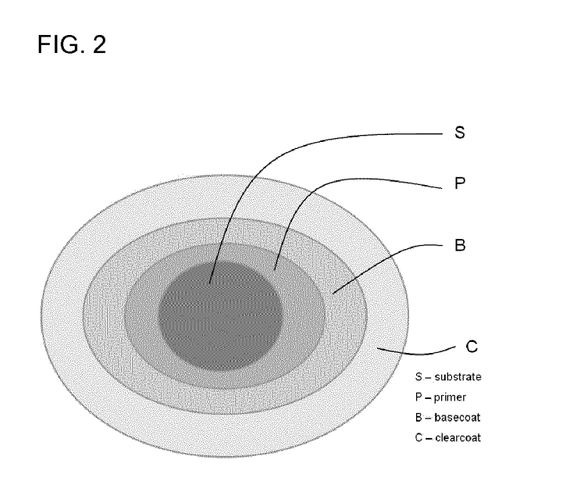
FIG. 2 is an exploded view of the spot repair area from FIG. 1.

Another issue with spraying primer-surfacer (especially solvent borne primer) for spot repairs is "read through" of the OEM coatings at the junction(s) of the inter-layer(s) exposed during sanding in preparation for the repair. These junctions are vulnerable to solvent entrapment and swelling which creates a bulge that is visible over the refinish top coat. A typical spot repair is illustrated in spot A of FIG. 1. An expanded view of spot A reveals a "bulls-eye" or "contour map" surface, as shown in FIG. 2. This surface is created due to how the damaged area and the surrounding area need to be sanded in preparation for spot repair.

Referring to FIG. 2, the area around the damage is sanded to create a tapered structure so the final appearance of the repair is flush to the existing coatings. Each circle in the bulls-eye in FIG. 2 represents the exposed coating; down to the substrate in the middle and tapered out to the clearcoat on the outside. When primer-surfacer is sprayed over these exposed inter-layers a bulge or read through may not be immediately visible; however, after the primer is flashed and cured, the bulge becomes visible due to swelling at the junction of the inter-layer(s) caused by the solvents in the primer. This read through can telegraph through after the topcoat is sprayed and cured.

Hence, it is an object of the invention to improve efficiency for spot repair compared to convention spraying methods and to reduce or avoid environmental and safety problems associated with conventional primer spraying. It is another object of the invention to reduce or eliminate contour map read through of previous coatings applied during the repair procedure.

SUMMARY OF THE INVENTION

The above mentioned objects are achieved by using a dry film transfer coating process according to the invention as an alternative to conventional spraying of a primer-surfacer. Vehicle repair shops can be more efficient, and environmental and safety problems associated with conventional primer spraying at the repair shop may be avoided, by using the dry primer film composite according to the invention. Making spot repairs using the dry primer film composite according to the invention can reduce or eliminate contour map read through that can result from previous coatings exposed to solvent swelling during a repair procedure using conventional spraying methods.

One aspect of this invention provides a process for manufacturing a flexible dry transfer film having a primer layer suitable for a quality vehicle repair and exterior durability. Dry transfer films are more environmentally compliant than spray applied coatings and offer time and energy savings for the repair shop.

According to one aspect of the invention, it is directed to a dry primer film composite comprising: a release carrier film and a pigmented sandable primer layer having a dry film thickness of about 100 microns or greater overlying the carrier film, wherein the primer layer is a thermally self cross-linking latent heat curing material. Examples of useful carrier films are a treated or untreated polyester (PET) sheet/film, or a treated or untreated biaxially oriented polypropylene (BOPP) sheet/film. In one embodiment, the carrier film is a silicone treated PET sheet.

In embodiments, the primer layer is formed from a coating composition comprising a binder chosen from thermoplastic acrylics (TPA), thermosetting acrylics, GMA acrylics, urethanes, epoxies, polyesters, and combinations thereof. The coating composition can also contain additional binders or use different binders, provided that upon drying the dried coating forms a latent heat curing material.

In an embodiment of the invention, the primer layer is formed from a coating composition comprising a binder system that is first thermoplastic and then becomes thermosetting as heat is added, and is not free-radical UV cured. In an embodiment, the coating system is free of a binder that contains free-radically polymerizable, olefinically unsaturated double bonds.

In embodiments of the invention, the primer layer is formed from a coating composition comprising a binder system chosen from: (i) an epoxy-amine system based on epoxy homopolymerization with a tertiary amine catalyst; (ii) a hybrid epoxy-polyester system based on epoxy reaction with an acid terminated polyester; (iii) a polyester system based on acid terminated polyester reaction with triglycidyl isocyanurate (TGIC); (iv) a GMA acrylic system based on GMA acrylics reaction with acid (such as, e.g., 1,12-dodecandioic acid); (v) a urethane system based on hydroxyl terminated polyesters; (vi) a urethane system based on acrylics reaction with malonate blocked isocyanates; (vii) a hybrid thermoplastic urethane and thermosetting urethane, wherein the thermosetting urethane is a type chosen from groups (v) or (vi) above; or (viii) combinations or any of the above systems.

In one embodiment, the primer layer is formed from a 1K or 2K coating composition comprising a crosslinking agent. Examples of crosslinking agents include isocyanates, melamines, and amines. Other suitable crosslinking agents known to the art for primer coating compositions are also contemplated, provided the resulting primer layer is a latent heat curing material.

In an embodiment of the invention, the primer layer is a latent heat curing material, wherein the primer layer is a self crosslinking 1K epoxy-amine system having a latent curing temperature in the range of about 100° C. to about 140° C. In an embodiment, the primer layer comprises pigments, coloring additives or combinations thereof, suitably of a type and in an amount to provide a primer layer that is color matched to the color of the surface of the substrate requiring spot repair.

In an embodiment of the invention, the dry primer film composite further comprises an adhesive layer overlying the primer layer. The adhesive layer can be a pressure sensitive adhesive coating that provides initial tack to a substrate and allows the film composite to be repositioned on the substrate prior to cure of the primer layer. In one embodiment, the pressure sensitive adhesive is an acrylate or methacrylate based formulation containing one or more low glass transition temperature esters.

In one embodiment, the primer layer has a latent heat curing temperature and melt/flow phase below the latent curing temperature, and the adhesive layer is compatible with the primer layer such that, during the melt/flow phase or during curing of the primer layer, the adhesive layer is absorbed into the primer layer and upon curing the resulting cured film is one layer.

In one embodiment, the primer layer has a dry film thickness in the range of about 100 microns (about 4 mils) to about 150 microns (about 6 mils) and the adhesive layer has a dry film thickness of about 5 microns (about 0.2 mils) or less.

In embodiments of the invention, the dry primer film composite further comprises a protective release layer overlying the adhesive layer.

It should be appreciated that the composite film can include any of the features or combination of features described in any of the embodiments or any combination of embodiments discussed herein in this application.

In another aspect, the invention is directed to a method for performing a spot repair of a surface of a coated substrate needing repair. In an embodiment, the method comprises: (a) preparing the existing coated substrate surface for spot repair in the area needing repair; (b) cutting the film composite (as described by any of the embodiments or combinations of the embodiments above) to match the size and shape of the surface area needing spot repair; (c) removing the protective release liner, if present, from the adhesive layer, positioning the film composite over the area of the surface needing spot repair and contacting the adhesive layer to the surface of the substrate to be repaired, and contouring the film composite to the area of the surface needing spot repair; (d) heating the film composite to a temperature sufficient for the primer layer to be in a melt/flow phase and tapering the edges of the film composite to the substrate surface; (e) curing the primer layer and adhering the primer film to the substrate; and (f) allowing the primer film to cool and removing the carrier film from the cured primer layer.

In embodiments of the invention, the method can further include the steps of: (g) sanding and tapering the cured primer layer in a similar fashion to a spray applied primer coating; and (h) finishing the spot repair area by (optionally) applying a sealer and by applying a topcoat in a similar fashion to a spot repair made using a spray applied primer.

The invention is particularly suited for use in spot repairing a substrate, where the substrate is a vehicle surface in need of spot repair.

DETAILED DESCRIPTION OF THE INVENTION

Dry transfer films with adhesives are used in a variety of areas such as tapes, decals, decorative and protective coverings for walls, furniture, floors, and generally for any purpose wherein it is desired to adhere an article to a substrate. These films can be categorized as self-wound or non-self-wound. Self-wound is more desirable as it eliminates the need to strip and discard a protective release layer during the application process. Examples of dry transfer films for surface coverings can be found in U.S. Pat. No. 5,229,207 to Paquette et al., U.S. Pat. No. 6,086,995 to Smith, U.S. Pub. No. 2007/0092679 A1 to Truog et al., U.S. Pat. No. 7,722,938 B2 to Truog et al., and U.S. Pat. No. 7,727,607 B2 to Shih et al. These examples relate to multilayer films containing print effects, pigments, clear topcoats, and pressure sensitive adhesives for decoration of various surfaces.

Examples of decorative plastic films mounted with pressure sensitive adhesives used in the automobile industry to add styling features can be found in U.S. Pat. No. 6,096,396 to Patton et al. and U.S. Pat. No. 5,518,786 to Johnson et al. These examples contain pigmented, printed, multilayer effects with a pressure sensitive adhesive and a clear, weatherable topcoat. The previous examples all relate to decoration or function where the applied film finishes, decorates, or completes the function in one step. However, none of the films described in these examples would be suitable for a primer film used in the vehicle repair process.

The present inventors have learned that a number of technical problems must be overcome in order to use a primer film composite for a vehicle repair process. For instance, the film composite should be sandable like a conventional sprayed primer. It would also be useful for the film be repositionable until ready to cure. Therefore, the adhesive layer should have a relatively low initial tack value which increases over time or after application of pressure and/or heat and thereafter becomes increasingly difficult to remove. The film should also avoid long-term delamination at the interface between the film and the vehicle body panel, and interlayer delamination between the primer and the subsequently spray applied topcoat layer(s). It would also be beneficial for the film to be flexible enough to position in and around curved and recessed areas of the vehicle needing repair. The film should also be compatible with topcoats typically used for vehicle repair, and not be susceptible to solvent attack or strike-in that would cause a bulge or read through the refinish topcoat. Durability properties are also important in producing a primer film for vehicle repair suitable for exterior use. In that regard, it would beneficial for the film to avoid degradation due to chemical and weather exposure (e.g., exposure to UV, heat, or corrosion).

The present invention provides a dry transfer film and application process that achieves the above objectives and reduces the painting steps carried out in conventional vehicle repair operations. The advantages over conventional painting operations include less VOC exposure, less environmental impact, and time and energy savings. Specifically, the invention relates to a primer-surfacer film that replaces mixing and spraying of a primer-surfacer coat (of more likely multiple primer coats) for vehicle repair. The invention also provides a means for reducing or eliminating the contour map read through of previous coatings exposed during the spot repair procedure, compared to conventional painting processes.

Figure 3:
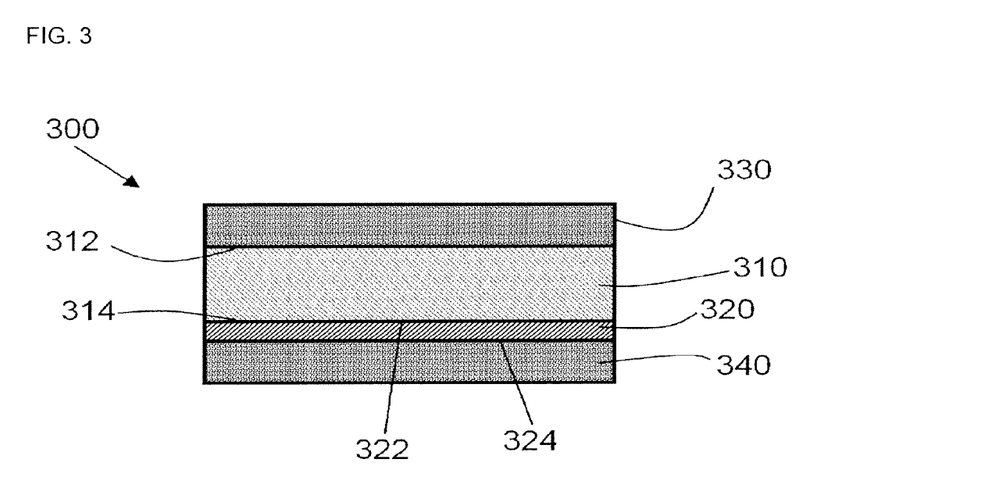
FIG. 3 is a cross-sectional view of an example of a dry primer composite film according to the invention.

The invention is further described in FIG. 3, showing an example of a cross-section of a primer film composite according to the invention. An example of a step by step process to manufacture a film according to the invention is illustrated in the block diagram shown in FIG. 4.

Referring to FIG. 3, a dry primer film composite, in one of its illustrated embodiments, is generally indicated by reference numeral 300, and comprises a pigmented primer layer 310 which has an upper surface 312 and a lower surface 314; an adhesive layer 320 which has an upper surface 322 and a lower surface 324, wherein upper surface 322 (of adhesive layer 320) is overlying and adhered to the lower surface 314 (of primer layer 310); a release carrier film 330 overlying and adhered to the upper surface 312 (of primer layer 310); and a protective release liner 340 overlying and adhered to the lower surface 324 (of adhesive layer 320).

The term "overlying," when referring to the relationship of one or a first layer relative to another or a second layer, refers to the fact that that a surface of the first layer contacts and partially or completely covers the adjacent surface of the second layer. The overlying layer may be either permanently or releasably affixed or adhered to the layer it overlies, in accordance with the intended function of the composite laminate as described herein.

The adhesive can be coated directly onto the lower surface 314 of primer layer 310, or first coated on the protective release liner 340 in a separate production step, dried, then laminated to the primer layer 310. If the adhesive is coated directly onto the lower surface 314 of primer layer 310, then the protective release liner 340 may not be necessary.

Figure 4:
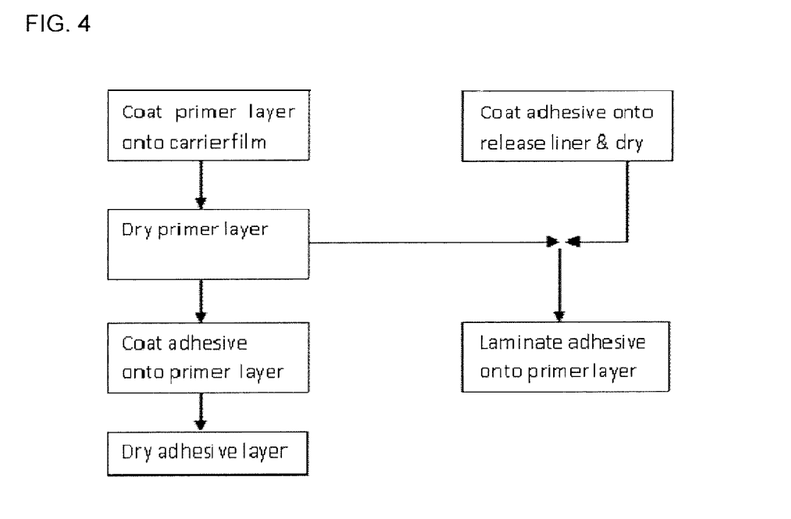
FIG. 4 is a block diagram illustrating alternate processes for preparing a dry primer composite film according to the invention.

Referring to FIG. 4, examples of alternative methods for manufacturing composites according to the invention are depicted. In one method (shown on the left side of the diagram), a composite film is prepared according to the following steps: (a) coating a primer layer onto a carrier film; (b) drying the primer layer; (c) coating an adhesive layer onto the dried primer layer; and (d) drying the adhesive layer. In an alternative method, steps (a) and (b) are preformed as above, but instead of steps (c) and (d), the following steps are performed: (e) coating an adhesive layer onto a protective release liner and drying the adhesive; and (f) laminating the dried adhesive layer onto the dried primer layer.

In embodiments where a protective release liner 340 is employed, the release liner 340 will typically be removed from the adhesive layer surface 324 just prior to affixing the film composite to a substrate to be repaired. In embodiments where a protective release liner is not employed, the film composite can be rolled on itself so that the adhesive layer surface 324 is contacted to the release carrier film 330 on the surface (of the carrier film) opposite the surface that is adhered to the dry primer layer surface 312.

The Carrier Film

The carrier film may comprise a polymer film, and examples of polymer films include polyolefin, polyester, and combinations thereof. The polyolefin films may comprise polymer and copolymers of mono-olefins having from 2 to about 12 carbon atoms, and in one embodiment from 2 to about 8 carbon atoms, and in one embodiment 2 to about 4 carbon atoms per molecule. Examples of such homopolymers include polyethylene, polypropylene, poly-1-butene, etc. Films prepared from blends of copolymers or blends of copolymers with homopolymers may be used. The films may be extruded in mono or multilayers. It is also contemplated that the polymer film can be modified with polylactic acid (PLA) or other biopolymer materials.

The carrier film, in one embodiment, provides structural integrity to the overall film composite until it is removed upon application of the composite to a substrate.

The carrier film can also be treated or coated with a release coating to adjust or control the release force between the carrier film and the dry primer layer. The release coating may comprise a single coat of release coating material or multiple coats. When multiple coats are used, each coat may have the same formulation, or different formulations may be used. The release coating may comprise any known release coating resins which provide sufficient tack or adherence between the release coating layer and the dry primer layer to prevent separation of the release coating from the carrier film during the making of the dry primer composite film and normal handling of such composite, and yet have sufficient release properties to provide for facilitated separation between the release coating and the dry (or cured) primer layer when using the composite.

The release coating may comprise an alkyd resin, a vinyl resin, acrylic resin and/or polyester resin cross linked with a melamine resin. The alkyd resins include resins formed by the condensation of one or more polyhydric alcohols with one or more polybasic acids or anhydrides. The polyhydric alcohols include glycerol and the polybasic acids or anhydrides include phthalic anhydride. Modified alkyds wherein the polybasic acid is substituted in part by a monobasic acid such as acrylic acid or a vegetable oil fatty acid may be used. The vinyl resins that may be used include polyvinyl chloride, polyvinyl acetate, copolymers of vinyl chloride and vinyl acetate, acrylic resins, methacrylic resins, polystyrene resins, and the like. The melamine resins include amino resins made by the condensation of melamine with formaldehyde or a compound capable of providing methylene bridges. The cross linking of the alkyd and/or vinyl resin with the melamine resin typically occurs when the release coating is applied to the carrier film and dried or cured. In one embodiment, the release coating comprises on a solids basis from zero to about 80% by weight, and in one embodiment about 10 to about 30% by weight alkyd resin; from zero to about 80% by weight, and in one embodiment about 10 to about 30% by weight vinyl resin; and from about 10 to about 30% by weight, and in one embodiment about 20 to about 25% by weight melamine resin.

The release coating may contain one or more solid particulates that project into the surface of the dry primer layer to provide the layer with a matte or flat finish. When particulates are present, the release coating may be referred to as a matte release coat or matte release coating layer. The particulates that may be used may be any of the filler pigments typically used in the paint film layers. Specific examples include talc and aluminum silicate. Particulates with irregular shapes (e.g., platelet shapes) may be used. By controlling the use of these particulates the surface finish of the dry primer layer may be controlled. For example, by using these particulates, the dry primer layer may be provided with a flat or semi-gloss finish. The primer layer may be provided with a glossy finish by not using or minimizing the use of these particulates. The weight ratio of particulates to resin or binder may range up to about 1.1:1, and in one embodiment about 0.7:1 to about 1.1:1, and in one embodiment from about 0.7:1 to about 0.9:1, and in one embodiment about 0.9:1 to about 1.1:1.

The release coating may independently comprise any release coating composition known in the art provided it has the appropriate release properties for the primer layer. Silicone release coating compositions may be used. The silicone release coating compositions typically comprise polyorganosiloxanes such as polydimethylsiloxanes. The silicone release coating composition may be room temperature cured, thermally cured, or radiation cured. Generally, the room temperature and thermally curable compositions comprise at least one polyorganosiloxane and at least one catalyst (or curing agent) for such polyorganosiloxane(s). These compositions may also contain at least one cure accelerator and/or adhesion promoter. As is known in the art, some materials have the capability of performing both functions, i.e., the capability of acting as a cure accelerator to increase the rate, reduce the curing temperature, etc., and also as an adhesion promoter to improve bonding of the silicone composition to the substrate (e.g., the carrier film). The use of such dual function additives where appropriate is within the purview of the invention.

The release force required to separate the release coating from the carrier sheet is advantageously greater than the release force required to separate the release coating from the dry primer layer. In embodiments of the invention, where a protective release liner is not used and the composite film is rolled upon itself, the release force required to separate the release coating (facing the primer layer) from dry primer layer is advantageously greater than the release force required to separate the release coating (facing the adhesive layer) from adhesive layer.

In one embodiment, the release force required to separate the release coating from the dried (un-cured) primer layer is less than about 19.7 grams per cm (about 50 grams per inch). In such an embodiment, the carrier (and release coating) can be removed from the primer layer prior to the primer layer curing, without damage to the primer layer.

In one embodiment, the release force required to separate the release coating from the cured primer layer is less than about 50 grams per inch. The release force required to separate the release coating from the dried primer layer (before curing) can be much greater. In some embodiments, it will not be possible to separate the release carrier film from the uncured primer layer without damaging the primer layer. In an embodiment where an adhesive layer is present and the composite film is rolled upon itself, the release force required to separate protective release liner from the adhesive layer is less than about 50 grams per inch.

In some situations, depending on the application, it may be desirable to leave the primer layer on the release carrier until after the primer layer is cured. In other situations it may be desirable to remove the release carrier prior to curing the primer layer. The desired behavior can be achieve by proper selection of the release carrier and/or the release coating on the carrier.

The test method for determining these release forces involves measuring the force required to separate a one-inch wide release coated carrier film (or protective release liner) from the dry or cured or uncured primer layer, or the adhesive layer, of the composite film, with the release coated carrier film/liner extending at an angle of 90° relative to the composite film and being pulled at a rate of 12 inches per minute. The test may be conducted at room temperature.

In one embodiment, the carrier film is chosen from a treated or untreated polyester sheet (PET), a treated or untreated biaxially oriented polypropylene (BOPP), or other typical polymeric carrier films known in the art, provided they have the appropriate release characteristics, as discussed above. In one embodiment, the carrier film is silicone treated PET. In one embodiment, the carrier film is transparent. In such an embodiment, it may be beneficial to be able to see through the carrier film during the melt/flow and curing stages of the primer layer to be able to taper and feather the edges effectively.

The Primer

The primer layer is formed from a coating composition that is applied onto the release carrier film and dried without causing the coating to cure. The dry primer layer is a thermally self cross-linking latent heat curing material.

As used herein, the term "thermally self cross-linking" means that the primer layer has a binder system that cross-links and will thermally cure (or set) upon the application of a sufficient amount of heat energy and that is not based on free radical cross-linking. The thermally self cross-linking system is thermally cured and is not suitable for (or based on) curing with actinic radiation, e.g., UV or EB energy.

As used herein, the term "latent curing material" means that dry primer layer undergoes no substantial curing under ambient conditions and behaves as a thermoplastic material when subjected to external stimulus, e.g., external energy, until a sufficient amount of the external stimulus is applied to activate curing, at which point the material behaves as a thermoset material and it cures or sets.

In embodiments of the invention, the dry primer layer undergoes no substantial curing (i.e., less than about 10% of curing relative to total cure) under ambient conditions for up to 7 days. In embodiments, the dry primer layer may undergo no substantial curing (i.e., less than about 10% of curing relative to total cure) under ambient conditions for up to one month, up to 3 months, up to 6 months, or longer. In other embodiments, the dry primer layer may undergo less than about 2% of curing relative to total cure under ambient conditions for up to 7 days, up to one month, up to 3 months, up to 6 months, or longer. In other embodiments, the dry primer layer may undergo less than about 1% of curing relative to total cure under ambient conditions for up to 7 days, up to one month, up to 3 months, up to 6 months, or longer. The dry primer layer may therefore exhibit an extended shelf life without curing. As used herein, ambient conditions means conditions commonly encountered without artificial climate control. This typically includes a temperature below about 50° C. and above about 0° C. Ambient conditions therefore include temperatures less than about 40° C. or 30° C. and above about 10° C. Some ambient conditions may include air oxygen levels between about 10% and about 30% by volume and/or humidity levels no greater than 95%, but only if such conditions are specifically recited.

In embodiments, the dry primer layer undergoes less than 20%, and more preferably less than 10%, of its total cure until acted upon by an external stimulus (e.g., exposure to a temperature greater than 80° C., or greater than 90° C., or greater than 100° C.). Once activated or during activation by a sufficient amount of external stimulus, the dry primer layer may undergo at least 80% of total cure. Curing may be accomplished by exposure to heat or thermal energy, including exposure to infrared radiation (IR).

By "latent heat curing material" is meant that the dry primer layer is a latent curing material that is transformed through a melt/flow region, where the primer behaves as a thermoplastic material, to final curing by addition of heat energy.

In embodiments of the invention, the dry primer layer is cured by heating (e.g., exposure to IR energy) and has a latent curing temperature. The "latent curing temperature" is the temperature at which cure is activated. In embodiments of the invention, the dry primer layer has a latent curing temperature in the range of about 100° C. to about 150° C., or about 100° C. to about 140° C., or about 110° C. to about 130° C., or about 110° C. to about 120° C.

At temperatures above ambient and below the latent curing temperature the dry primer film behaves as a thermoplastic material, where the material is capable of being deformed or caused to flow without causing it to set or cure by heating the layer to an appropriate temperature. In embodiments of the invention, the dry primer layer is caused to enter a melt/flow phase and has a melt/flow temperature. The melt/flow temperature is the temperature at which the dry primer layer begins to melt and flow (or can be caused to flow or deform by applying force) so that it can be shaped, e.g., the edges of the composite film can be tapered or feathered to a substrate (to which the composite is applied) at the outer perimeter of the composite. In embodiments of the invention, the dry primer layer has a melt/flow temperature in the range of about 75° C. up to the latent curing temperature, or about 75° C. to about 110° C., or about 80° C. to about 100° C., or about 80° C. to about 95° C., with the proviso that the melt/flow temperature is below the latent curing temperature.

In embodiments of the invention, the primer layer can be formed from a coating comprising a binder chosen from thermoplastic acrylics (TPA), thermosetting acrylics, GMA acrylics, urethanes, epoxies, polyesters, and combinations thereof, provide that the dried coating forms a latent heat curing material. Other binders are also contemplated, either alone or in combination with the binders listed above, provided that upon drying the dried coating forms a latent heat curing material. In embodiments of the invention, the primer layer can be a 1K or 2K coating system, crosslinked with isocyanates, melamines, amines, or other appropriate crosslinking agents.

In an embodiment of the invention, the primer layer is formed from a coating composition comprising a binder system that is first thermoplastic and then becomes thermosetting as heat is added, and is not free-radical cured, e.g., not UV cured. In an embodiment, the coating system is free of a binder that contains free-radically polymerizable, olefinically unsaturated double bonds.

In embodiments of the invention, the primer layer is formed from a coating composition comprising a binder system chosen from: (i) an epoxy-amine system based on epoxy homopolymerization with a tertiary amine catalyst; (ii) a hybrid epoxy-polyester system based on epoxy reaction with an acid terminated polyester; (iii) a polyester system based on acid terminated polyester reaction with triglycidyl isocyanurate (TGIC); (iv) a GMA acrylic system based on GMA acrylics reaction with acid (such as, e.g., 1,12-dodecandioic acid); (v) a urethane system based on hydroxyl terminated polyesters; (vi) a urethane system based on acrylics reaction with malonate blocked isocyanates; (vii) a hybrid thermoplastic urethane and thermosetting urethane, wherein the thermosetting urethane is a type chosen from groups (v) or (vi) above; or (viii) combinations or any of the above systems.

In one embodiment, the binder system is an epoxy-amine system based on epoxy homopolymerization with a tertiary amine catalyst. The primer layer based on this type of system has been found to have an excellent combination of melt/flow properties, cure time, final hardness/sandability, stability of the liquid mix prior to casting, and formulating latitude.

The primer coating can also be pigmented and contain appropriate fillers to achieve the desired properties. In one embodiment, the primer coating is a self crosslinking 1K epoxy-amine system with a latent curing temperature in the range of about 100° C. to about 140° C., e.g., about 120° C. or about 130° C. Below the latent curing temperature, the primer layer acts like a thermoplastic or a hot melt coating. Above the latent curing temperature, the primer layer will melt and flow and begin to react. After sufficient reaction time and temperature, the primer layer becomes a cured thermoset with the desired properties of a refinish primer.

In embodiments of the invention, the primer layer contains pigments or coloring additives. In one embodiment, the primer layer is colored to match the color of the surface of the substrate requiring the spot repair.

The primer coating can also include additional polymeric materials which can include a variety of different polymers, such as thermoplastics, elastomers, plastomers, flexibilizers, combinations thereof, or the like.

The primer coating can include any pigments typically included in conventional liquid (e.g., spray applied) primers, provided the dry primer layer meets the melt/flow and curing characteristics described above. The primer coating may also include one or more fillers, including but not limited, to particulated materials (e.g., powder), beads, microspheres, or the like. Preferably, the filler includes a material that is generally non-reactive with the other components present in the material, although surface treated fillers with reactive functionalities may be used. While the fillers may be present within the primer material to take up space at a relatively low weight, it is contemplated that the fillers may also impart properties such as stiffness, strength, and impact resistance to the primer material.

Examples of fillers, without limitation include silica, mica, diatomaceous earth, glass, clay (e.g., including nanoclay), calcium carbonate, wollastonite, talc, pigments, colorants, glass beads or bubbles, glass, carbon or ceramic fibers, nylon or polyamide fibers (e.g., KEVLAR®), antioxidants, and the like. Such fillers, particularly clays, can assist the primer material in leveling itself during flow of the material. The clays that may be used as fillers may include clays from the kaolinite, illite, chloritem, smecitite or sepiolite groups. The clays may be calcined or uncalcined. Examples of additional suitable fillers include, without limitation, talc, vermiculite, pyrophyllite, sauconite, saponite, nontronite, montmorillonite or mixtures thereof. The clays may also include minor amounts of other ingredients such as carbonates (e.g., calcium carbonate), feldspars, micas and quartz, which may be mineral, powder or stone type fillers. The fillers may also include organoclays. Titanium dioxide might also be employed.

When employed, the fillers in the primer material may range from about 1% or less to about 50% or greater by weight of the primer material. The amount of filler and prime color pigment is selected to achieve the desired melt/flow and curing properties, as well as desired color, hiding power, and sandability. In embodiments, the amount of fillers plus prime color pigment can range from about 1% to about 50%, or about 5 to about 40%, or about 10 to about 30%, or about 10 to about 20%, by weight of the primer coating. Although fillers are mentioned in detail, it is understood by those of ordinary skill in the art that fillers are not required for the inventive primer layer.

One or more blowing agents may be added to primer coating for producing inert gasses that form, as desired, an open and/or closed cellular structure within the primer layer. In this manner, it may be possible to lower the density of the composite. In addition, the material expansion can help to improve sealing capability, acoustic damping, adhesion (e.g., wetting capability) or the like when desired. The blowing agent may include one or more nitrogen containing groups such as amides, amines and the like. Examples of suitable blowing agents include azodicarbonamide, dinitrosopentamethylenetetramine, azodicarbonamide, dinitrosopentamethylenetetramine, 4,4.sub.i-oxy-bis-(benzenesulphonylhydrazide), trihydrazinotriazine and N,N.sub.i-dimethyl-N,N.sub.i-dinitrosoterephthalamide. The blowing agent may also be a physical blowing agent such as a thermoplastic shell filled with an agent with a low boiling solvent. Upon heating the shell softens and the solvent volatilizes, causing an increase in volume of the shell. Blowing agents of this type are available under the trade name EXPANCEL®.

Although blowing agents are mentioned in detail, it is understood by those of ordinary skill in the art that blowing agents are not required for the inventive primer layer.

When determining appropriate components for the primer layer coating, it may be important to form the material such that it will only activate (e.g., flow, foam, cure or otherwise change states) at appropriate times or temperatures. Depending upon its intended application, the primer layer may be applied and activated in different ways and at different times, as understood by those of ordinary skill in the art.

The primer layer can be applied to the carrier film with any number of application methods known to the art (spray, roll, gravure, slot-die coat). The preferred application methods are knife or slot-die coating. In embodiments of the invention, the primer coating is fully dried in the casting step, is block resistant, and can be wound in a roll. The drying temperatures are sufficient to force the solvent out of the film but not initiate enough cross-linking in the film so that it no longer remains a thermoplastic/hot melt below the latent curing temperature.

In one embodiment, the primer layer is formed from a primer coating that includes a combination of a an epoxy resin and a polyester polyol. In an embodiment, the epoxy resin is bisphenol A type epoxy with softening temperature in the range of about 80 to about 100° C. In an embodiment, the primer coating can include an acid terminated polyester with a glass transition temperature in the range of about −20° C. to about 0° C.

The coating can also include reactive latent amine adduct hardener/accelerator with a softening temperature range in the range of about 80 to about 120° C. and latency up to about 140° C. Suitable flow and leveling enhancers for epoxy-, polyester-, hybrid-, and other self crosslinking thermoplastic systems can also be included. Imidazole type cure accelerator or other suitable cure accelerators for epoxy-amine systems are also contemplated.

In one embodiment, the primer coating includes a epoxy resin in an amount from about 20 to about 40%, a latent amine accelerator in an amount in the range of about 1 to about 5%, a polyester resin in an amount from about 5 to about 30%, a flow enhancer in an amount from 0 to about 5%, and a cure accelerator for an epoxy-amine system in an amount from 0 to about 5%, based on the weight of the primer coating.

In embodiments of the invention, the primer layer dry film thickness can be in the range from about 100 microns (about 4 mils) up to about 250 microns (about 10 mils), or about 100 microns (about 4 mils) up to about 225 microns (about 9 mils), or about 100 microns (about 4 mils) up to about 200 microns (about 8 mils), or about 100 microns (about 4 mils) up to about 150 microns (about 6 mils). In embodiments of the invention, the primer layer dry film thickness can be in the range from about 150 microns (about 6 mils) up to about 250 microns (about 10 mils), or about 175 microns (about 7 mils) up to about 250 microns (about 10 mils), or about 200 microns (about 8 mils) up to about 250 microns (about 10 mils), or about 225 microns (about 9 mils) up to about 250 microns (about 10 mils).

The Adhesive

The adhesive layer (if present) may comprise a pressure sensitive adhesive (PSA) layer, a moisture activatable adhesive layer or a heat activatable adhesive layer. The adhesive may comprise any pressure sensitive, moisture activatable or heat activatable adhesive known in the art for use with film substrates. The adhesive layer may be in the form of a continuous or discontinuous layer, and may comprise one or a mixture of two or more adhesives. The adhesive layer may be in the form of a patterned adhesive layer with a relatively strong adhesive in some areas and a relatively weak adhesive in other areas. In one embodiment, the adhesive layer provides initial tack and allows slight movement of the laminate to allow positioning adjustments prior to forming a permanent bond to the substrate. In one embodiment, the adhesive layer is characterized by producing only a limited amount of ooze beyond the borders of the laminate when the laminate is applied to a substrate. In one embodiment, no ooze is produced.

In embodiments, the adhesive may comprise a rubber based adhesive, acrylic adhesive, vinyl ether adhesive, silicone adhesive, or mixture of two or more thereof. The adhesive may be applied as a hot melt, solvent-based or water based adhesive. In embodiments, the adhesive may comprise UV cured pressure sensitive adhesives and/or UV hot melt adhesives.

Adhesive materials that are useful may contain as a major constituent an adhesive polymer such as an acrylic-type polymer; block copolymer; natural, reclaimed, or styrene-butadiene rubber; tackified natural or synthetic rubber; a copolymer of ethylene and vinyl acetate; an ethylene-vinyl-acrylic terpolymer; polyisobutylene; poly(vinyl ether); etc. Other materials may be included in the adhesive such as tackifying resins, plasticizers, antioxidants, fillers, waxes, etc.

Pressure-sensitive adhesives that may be used include the pressure-sensitive adhesives available from Ashland, e.g., under the name AROSET®. Other useful pressure-sensitive adhesives include those available from BASF, Henkel, 3M.

In one embodiment, the adhesive is a clear pressure sensitive adhesive coating. In one embodiment, the adhesive resin is an acrylate or methacrylate based composition typified by low glass transition temperature esters. Examples of useful acrylic esters include methyl acrylate, ethyl acrylate, n-propyl acrylate, isopropyl acrylate, n-butyl acrylate, isobutyl acrylate, tert-butyl acrylate, amyl acrylate, hexyl acrylate, octyl acrylate, 2-ethylhexyl acrylate, undecyl acrylate, or lauryl acrylate. Glass transition temperatures of such acrylic esters can be in the range of about 0 to about −80° C. In an embodiment, the adhesive is solventborne and may or may not be crosslinked.

The adhesive may be selected from among many commercially available PSA's provided that the adhesive layer holds the primer film composite in place, especially on vertical surfaces, and allows the primer film to be positioned/repositioned without damaging the film. The adhesive need only provide initial tack and be repositionable for the primer film before cure.

In one embodiment, the adhesive layer is compatible with the primer layer so that during the melt/flow phase of the primer layer and/or during cure, the adhesive layer will become absorbed into the primer layer making the cured film one layer. In such an embodiment, the absorption of the adhesive layer into the primer layer and any negative impact the adhesive layer would have on the final bond of the primer film to the substrate can be controlled (at least to some extent) by the dry film thickness of the adhesive layer. In one embodiment, the adhesive layer is as thin as possible, while achieving the required function of adequately initially holding the composite film in place prior to curing the primer layer.

In an embodiment, the PSA has a Tg of less than −15° C. and is an uncross-linked type PSA, which remains soft and tacky. In an embodiment, the PSA absorbs into the primer layer because the thickness of the PSA is small compared to the thickness of the primer layer, preferably having a dry film thickness ratio of primer layer to PSA layer is in the range from about 30:1 or up to about 50:1. Because the PSA is not cross-linked, the adhesive is easily overtaken by the melting primer layer in the melt phase allowing the primer film to melt down into and through the very thin PSA layer and come in contact with the repair surface.

An example of a dry primer composite film having a compatible adhesive layer that gets absorbed into the primer layer is a latent heat cure epoxy-polyester-amine primer with an acrylic PSA, wherein the primer layer has a DFT of about 125 microns (about 5 mils) and the adhesive layer has a DFT of less than about 5 microns (about 0.2 mils). Specific examples are presented in the working examples below.

In embodiments, the adhesive can be applied either directly to the primer coat or to a separate release liner in another step by any number of application methods know to the art. In embodiments of the invention, the adhesive dry film thickness can be up to about 12.5 microns (about 0.5 mils), or up to about 10 microns (about 0.4 mils) or up to about 7.5 microns (about 0.3 mils). In one embodiment, the adhesive film build is about 5 microns (about 0.2 mils) or less. In one embodiment, the adhesive layer is applied using gravure printing. If applied to a separate release liner, the adhesive is laminated to the primer layer to form the final structure, e.g., as shown in FIG. 3.

The Protective or Release Liner (Optional)

The (optional) protective release liner can be similar to the types of films described under the carrier film. The release liner, if used, must have preferential release from the adhesive so as not to remove the primer from the carrier film.

In embodiments, the protective release liner may independently comprise paper, polymer film, or a combination thereof. The release liner, in one embodiment, is thermally stable, non-elastomeric and non-stretchable at room temperature. Paper liners can be useful because of the wide variety of applications in which they can be employed. Paper is also relatively inexpensive and has desirable properties such as antiblocking, antistatic, dimensional stability, and can potentially be recycled. Any type of paper having sufficient tensile strength to be handled in conventional paper coating and treating apparatus can be employed as the release liner. Thus, any type of paper can be used depending upon the end use and particular personal preferences. Included among the types of paper which can be used are clay coated paper, glassine, polymer coated paper, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any weight may be employed as a release liner, paper having weights in the range of from about 30 to about 120 pounds per ream are useful, and papers having weights in the range of from about 60 to about 100 pounds per ream may be used. The term "ream" as used herein equals 3000 square feet.

Another type of material which may be used as the protective release liner is a polycoated kraft liner which is basically comprised of a kraft liner that is coated on either one or both sides with a polymer coating. The polymer coating, which can be comprised of high, medium, or low density polyethylene, propylene, polyester, or other similar polymer films, is coated onto the substrate surface to add strength and/or dimensional stability to the liner. The weight of these types of liners ranges from about 30 to about 100 pounds per ream, with about 94 to about 100 pounds per ream being useful. In total, the final backing liner 132 may comprise from about 10% to about 40% polymer and from about 60% to about 90% paper. For two sided coatings, the quantity of polymer may be approximately evenly divided between the top and bottom surface of the paper.

The paper based protective release liners may also contain release coatings as described above with regard to the carrier film.

Application Procedures

The composite primer film can be initially applied to a spot repair area in a similar manner to using other dry film transfer methods. In one embodiment, the film application and spot repair can be performed as follows:

preparing the existing coated substrate surface for spot repair in the area needing repair;

cutting the film composite to match the size and shape of the surface area needing spot repair;

removing the protective release liner, if present, from the primer layer or the adhesive layer, if present, positioning the film composite over the area of the surface needing spot repair and contacting the primer layer or the adhesive layer, if present, to the surface of the substrate to be repaired, and contouring the film to the area of the surface needing spot repair;

heating the film composite to a temperature sufficient for the primer layer to be in a melt/flow phase and tapering the edges of the film composite to the substrate surface;

heating the film to a temperature sufficient to cure the primer layer and permanently adhere the primer film to the substrate; and allowing the primer film to cool and removing the carrier film from the cured primer layer.

In embodiments of the invention, the carrier film can be removed prior to contouring the film to the surface, or prior to heating the film, or prior to the primer layer reaching the melt/flow phase. In one embodiment, the carrier is removed prior to heating the film. In an embodiment where there is no adhesive layer, the primer layer has sufficient tack to hold the film in place and the carrier can be removed prior to heating the primer layer.

In another embodiment, the spot repair further includes:
sanding and tapering the cured primer layer in a similar fashion to a spray applied primer coating; and
finishing the spot repair area by optionally applying a sealer and by applying a topcoat in a similar fashion to a spot repair made using a spray applied primer.

In an embodiment, the substrate is a vehicle surface in need of spot repair. In such an embodiment, the spot repair of the vehicle can be performed as follows:

1) Prepare existing coating for spot repair;
2) Cut primer film section to match the size of the area that you would normally be spray applied with primer-surfacer;
3) Pre-treat the spot repair area for corrosion protection and let dry, e.g., with AUTOPREP® pretreatment wipes (Akzo Nobel Inc.);
4) Remove protective release liner from adhesive (if applicable) and lay down primer film with adhesive side down, and position film into desired area and contour to substrate with plastic squeegee;
5) Place IR lamp over repair area and heat to surface temperature between about 175° F.-212° F. (about 80° C.-100° C.) and maintain for about 3-4 minutes, until the primer layer begins to melt and flow;
6) Use plastic squeegee to taper the edges of the primer film while it is in the melt/flow phase;
7) Heat with IR lamp to a temperature between 230° F.-250° F. (about 110° C.-120° C.) about for an additional 15-20 minutes, until the primer layer is cured and the primer film is permanently adhered to the substrate;
8) Remove IR heat and let the area cool to touch and remove the carrier film from the primer layer (understanding that if the carrier film does not easily remove from the primer, then the primer has not sufficiently cured);
9) Sand and taper the primer as you normally would a spray applied primer; and
10) Finish the repair with sealer (optional) followed by topcoat.

EXAMPLES

The invention is further illustrated by the following examples:

Example 1

A primer film according to the invention was prepared, having a) a release coated carrier sheet, b) a primer layer, and c) a pressure sensitive adhesive layer.

The primer film was prepared from a liquid coating composition of the following components; the amounts are in parts by weight (pbw)

| EXP 2089-43 | |
| --- | --- |
| Component | Parts |
| MAK | 5.06 |
| MEK | 21.27 |
| Araldite GT7013 | 28.64 |
| Aradur 3261-1 | 1.29 |
| Raven Black 450 | 1.15 |
| Resiflow P67 | 0.43 |
| Omya BLR3 | 10.88 |
| Toluene | 21.27 |
| Setal 26-9079 | 10.01 |
| | 100.00 |

Araldite GT7013 is a solid, unmodified bisphenol A epoxy from Huntsman Corporation
Aradur 3261-1 is a cyclohexylamine (DMCHA) from Huntsman Corporation
Raven 450 is a black pigment from Columbian Chemicals Co
Resiflow P67 is a flow and leveling additive from Estron Chemical
Omya BLR3 is calcium carbonate from OMYA
Setal 26-9079 is a proprietary polyester polyol from Akzo Nobel The composition was cast on a silicone treated PET carrier film (from Mitsubishi Polyester Film, Inc) and dried in an oven at 250° F. (about 120° C.) for 6 minutes to flash off all the solvent. The dry film thickness (DFT) was approximately 125 microns (about 5 mils).

An adhesive layer was prepared from a liquid coating composition of the following components; the amounts are in pbw.

| Component | Parts |
| --- | --- |
| MEK | 28.00 |
| Aroset 1452-Z-40 | 72.00 |
| | 100.00 |

Aroset 1452-Z-40 is a PSA resin from Ashland

The adhesive was coated onto the dried primer film and flashed in an oven at 250° F. (about 120° C.) for 2 minutes to flash off all the solvent. The DFT was less than about 5 microns (about 0.2 mils). The primer film composite was applied to a sample repair panel in a similar manner to the steps regarding the embodiment for spot repairing a vehicle described above. The primer film was allowed to cure under IR heat for 25 minutes, after which the PET carrier was easily removed. The primer film and surrounding area was sanded and tapered in preparation for application of topcoat. The cured primer film was very hard and highly sandable. About 12.5 microns (about 0.5 mils) DFT Colorbuild™ Plus 250 sealer system (Akzo Nobel) was applied to the repair area, followed by about 25 microns (about 1.0 mil) DFT Autobase Plus® Black basecoat system (Akzo Nobel), then about 50 microns (about 2.0 mils) DFT Autoclear® III clearcoat system (Akzo Nobel). The coated panel was baked for 45 minutes at 60° C.

The topcoat systems showed excellent application over the cured primer film and the film showed excellent adhesion to the substrate and the topcoats. The cross-hatch tape adhesion method according to ASTM D 3359 was used.

Example 2

A primer film with a PSA was prepared in the same way as in Example 1, except the primer film was prepared from another liquid coating composition of the following components; the amounts are in pbw.

| EXP 2089-45 | |
|---|---|
| Component | Parts |
| MAK | 5.04 |
| MEK | 21.21 |
| Araldite GT7013 | 28.55 |
| Aradur 3261-1 | 1.29 |
| Raven Black 450 | 1.15 |
| Resiflow P67 | 0.43 |
| Omya BLR3 | 10.84 |
| Curezol 1B2PZ | 0.30 |
| Toluene | 21.21 |
| Setal 26-9079 | 9.98 |
| | 100.00 |

Curezol 1B2PZ is an imidazole accelerator from Shikoku Chemicals Corp.

The composition was cast on a silicone treated PET carrier and dried in an oven at 250° F. (about 120° C.) for 6 minutes to flash off all the solvent. The DFT was about 125 microns (about 5 mils). The adhesive layer was prepared from the same composition and procedure as in Example 1. The application procedure of the primer film composite to the sample panel was the same as in Example 1, except the cure time of the primer film was reduced from 25 minutes to 15 minutes. The cured primer film was very hard and highly sandable. A topcoat system was applied as in example 1, and the interlayer adhesion of the primer film was excellent.

Example 3

Primer films with a PSA were prepared in the same way as in Example 1, except with the liquid coating compositions having the following formulations:

Black Base Formula

| EXP 2089-57 | |
|---|---|
| Component | Parts |
| MAK | 3.66 |
| MEK | 15.17 |
| Araldite GT7013 | 31.46 |
| Aradur 3261-1 | 1.42 |
| Raven Black 450 | 1.27 |
| Resiflow P67 | 0.47 |
| Omya BLR3 | 12.10 |
| Curezol 1B2PZ | 0.33 |
| Toluene | 15.17 |
| Setal 26-9079 | 18.95 |
| | 100.00 |

White Base Formula

| EXP 2089-61 | |
|---|---|
| Component | Parts |
| MAK | 3.34 |
| MEK | 14.08 |
| Araldite GT7013 | 33.14 |
| Aradur 3261-1 | 1.49 |
| Kronos 2310 | 6.03 |
| Resiflow P67 | 0.50 |
| Omya BLR3 | 8.06 |
| Curezol 1B2PZ | 0.33 |
| Toluene | 14.08 |
| Setal 26-9079 | 18.95 |
| | 100.00 |

Kronos 2310 is a titanium dioxide pigment from Kronos Inc.

The above compositions were prepared and applied to sample repair panels as described in example 1. The resulting composite films showed improved flexibility for manual handling of the dry primer film composite, i.e., less tendency to crack when bending the film. The films and also showed a lower melt/flow temperature (i.e., temperature for onset of the melt/flow phase was close to 80° C.) prior to cure of the primer film. It is understood that the black and white base formulas can be mixed to achieve light or dark shades of gray and that any other color can be made.

Example 4

A primer film according to the invention was prepared, having a) a release coated carrier sheet, b) a primer layer.

Primer films were prepared from liquid coating compositions of the same components shown in example 3. The composition was cast on a very low release (less than 30 dynes) silicone treated PET carrier film (from St. Gobain) and dried in an oven at 250° F. (about 120° C.) for 6 minutes to flash off all the solvent. The dry film thickness (DFT) was approximately 125 microns (about 5 mils). The primer film composite was applied to a sample repair panel in a similar manner to the steps regarding the embodiment for spot repairing a vehicle described above, except that the release coated carrier sheet was removed prior to melting and curing the primer film. The uncured primer film exhibited enough tack to hold the primer film onto the surface to be repaired, and the release coated carrier sheet was easily removed from the primer layer once it was tacked down to the repair surface with light pressure. With the carrier sheet removed prior to melting and curing, the primer film was more easily tapered with a squeegee. The primer film was melted, cured, and sanded in a manner similar to previous examples.

The invention is further illustrated by the following claims, which, however, are not intended to limit the scope thereof.

What is claimed is:

1. A method for spot repair of a substrate, comprising the step of applying a dry primer film composite to the substrate, the dry primer film composite comprising:
   a release carrier film;
   a pigmented sandable primer layer having a dry film thickness (DFT) of about 100 microns (μm) or greater overlying the carrier film; and
   wherein the primer layer is a thermally self cross-linking latent heat curing material having a latent curing temperature in the range from 100° C. to 140° C. and having a melt/flow temperature in the range from 75° C. up to its latent curing temperature, and further wherein the primer layer is formed from a coating composition comprising a binder system chosen from: (i) an epoxy-amine system based on epoxy homopolymerization with a tertiary amine catalyst; (ii) a hybrid epoxy-polyester system based on epoxy reaction with an acid terminated polyester; (iii) a polyester system based on acid terminated polyester reaction with triglycidyl isocyanurate (TGIC); (iv) a GMA acrylic system based on GMA acrylics reaction with acid; (v) a urethane system based on hydroxyl terminated polyesters; (vi) a urethane system based on acrylics reaction with malonate blocked isocyanates; (vii) a hybrid thermoplastic urethane and thermosetting urethane, wherein the thermosetting urethane is a type chosen from groups (v) or (vi) above; or (viii) combinations of any of the above systems.

2. The method according to claim 1, wherein said carrier film is chosen from a treated or untreated polyester (PET) sheet/film, or a treated or untreated biaxially oriented polypropylene (BOPP) sheet/film.

3. The method according to claim 2, wherein said carrier film is a silicone treated PET sheet.

4. The method according to claim 1, wherein said primer layer is formed from a 1K or 2K coating composition comprising a crosslinking agent.

5. The method according to claim 1, wherein said primer layer is a self crosslinking 1K epoxy-amine system with a latent curing temperature in the range of about 100° C. to about 140° C.

6. The method according to claim 1, wherein said primer layer comprises pigments, coloring additives or combinations thereof.

7. The method according to claim 1, further comprising an adhesive layer overlying the primer layer, wherein the adhesive layer is a pressure sensitive adhesive coating that provides initial tack to a substrate and allows the film composite to be repositioned on the substrate prior to cure of the primer layer.

8. The method according to claim 7, wherein the pressure sensitive adhesive is an acrylate or methacrylate based formulation containing one or more esters with a glass transition temperature of 0° C. to 80° C.

9. The method according to claim 7, wherein the adhesive layer is absorbed into the primer layer upon heat curing of the primer, and wherein the resulting cured film is one layer.

10. The method according to claim 1, wherein the primer layer has a dry film thickness in the range of about 100 to about 150 microns (μm) and the adhesive layer has a dry film thickness of less than about 5 microns (μm).

11. The method according to claim 7, further comprising a protective release film on the adhesive layer.

12. The method according to claim 1, wherein the primer layer is free of a binder that contains free-radically polymerizable, olefinically unsaturated double bonds.

13. A method for performing a spot repair of a surface of a coated substrate needing repair, said method comprising the steps of:
selecting a dry primer film composite, said film composite comprising: a release carrier film; and a pigmented sandable primer layer having a dry film thickness (DFT) of about 100 microns (μm) or greater overlying the carrier film; wherein the primer layer is a thermally self cross-linking latent heat curing material having a latent curing temperature in the range from 100° C. to 140° C. and having a melt/flow temperature in the range from 75° C. up to its latent curing temperature;
preparing the existing coated substrate surface for spot repair in the area needing repair;
cutting the film composite to match the size and shape of the surface area needing spot repair;
positioning the film composite over the area of the surface needing spot repair and contacting the primer layer to the surface of the substrate to be repaired, and contouring the film composite to the area of the surface needing spot repair;
heating the film composite to a temperature sufficient for the primer layer to be in a melt/flow phase and tapering the edges of the film composite to the substrate surface;
curing the primer layer and adhering the primer film to the substrate; and
allowing the primer film to cool and removing the carrier film from the cured primer layer.

14. The method according to claim 13, further comprising the steps of:
sanding and tapering the cured primer layer in a similar fashion to a spray applied primer coating;
finishing the spot repair area by optionally applying a sealer and by applying a topcoat in a similar fashion to a spot repair made using a spray applied primer.

15. The method according to claim 13, wherein the substrate is a vehicle surface in need of spot repair.

16. A method for performing a spot repair of a surface of a coated substrate needing repair, said method comprising the steps of:
selecting a dry primer film composite, said film composite comprising: a release carrier film; and a pigmented sandable primer layer having a dry film thickness (DFT) of about 100 microns (μm) or greater overlying the carrier film; wherein the primer layer is a thermally self cross-linking latent heat curing material having a latent curing temperature in the range from 100° C. to 140° C. and having a melt/flow temperature in the range from 75° C. up to its latent curing temperature;
preparing the existing coated substrate surface for spot repair in the area needing repair;
cutting the film composite to match the size and shape of the surface area needing spot repair;
positioning the film composite over the area of the surface needing spot repair and contacting the primer layer to the surface of the substrate to be repaired, and contouring the film to the area of the surface needing spot repair;
removing the carrier film from the primer layer;
heating the primer layer film to a temperature sufficient for the primer layer to be in a melt/flow phase and tapering the edges of the primer layer to the substrate surface;
curing the primer layer and adhering the primer to the substrate; and
allowing the primer film to cool.

17. The method according to claim 16, further comprising the step of:
sanding and tapering the cured primer layer in a similar fashion to a spray applied primer coating;
finishing the spot repair area by optionally applying a sealer and by applying a topcoat in a similar fashion to a spot repair made using a spray applied primer.

18. The method according to claim 16, wherein the substrate is a vehicle surface in need of spot repair.

* * * * *